United States Patent
Sebastian et al.

(10) Patent No.: US 12,003,388 B1
(45) Date of Patent: Jun. 4, 2024

(54) PATH CONFIGURATION IN A NETWORK DEVICE USING A USER VISIBLE REPRESENTATIVE INTERFACE

(71) Applicant: Arista Networks, Inc., Santa Clara, CA (US)

(72) Inventors: Deepak Sebastian, San Francisco, CA (US); Karthikeya Kumar Pandit, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/366,454

(22) Filed: Aug. 7, 2023

(51) Int. Cl.
*H04L 41/22* (2022.01)
*H04L 41/08* (2022.01)
*H04L 45/00* (2022.01)
*H04L 45/02* (2022.01)
*H04L 45/30* (2022.01)
*H04L 49/111* (2022.01)
*H04L 49/15* (2022.01)
*H04L 49/25* (2022.01)

(52) U.S. Cl.
CPC .......... *H04L 41/22* (2013.01); *H04L 41/0883* (2013.01); *H04L 45/04* (2013.01); *H04L 45/30* (2013.01); *H04L 45/38* (2013.01); *H04L 49/111* (2022.05); *H04L 49/15* (2013.01); *H04L 49/25* (2013.01)

(58) Field of Classification Search
CPC ..... H04L 41/22; H04L 41/0883; H04L 45/04; H04L 45/30; H04L 45/38; H04L 49/111; H04L 49/15; H04L 49/25
See application file for complete search history.

(56) References Cited

U.S. PATENT DOCUMENTS

| | | | | |
|---|---|---|---|---|
| 6,640,278 | B1* | 10/2003 | Nolan | H04L 63/0428 707/999.102 |
| 7,380,025 | B1* | 5/2008 | Riggins | H04L 41/0853 710/10 |
| 7,898,986 | B2* | 3/2011 | Ford | H04L 41/0893 370/255 |
| 9,225,666 | B1* | 12/2015 | Aybay | H04L 49/115 |
| 2014/0108584 | A1* | 4/2014 | Lu | H04L 47/76 709/208 |
| 2015/0049636 | A1* | 2/2015 | Tai | H04L 41/08 370/254 |
| 2016/0191314 | A1* | 6/2016 | Russell | H04L 41/22 709/221 |
| 2017/0085422 | A1* | 3/2017 | Chapman | H04L 49/25 |
| 2017/0118140 | A1* | 4/2017 | Lu | H04L 49/15 |
| 2022/0121928 | A1* | 4/2022 | Dong | H04L 41/0893 |

* cited by examiner

*Primary Examiner* — Ramy M Osman
(74) *Attorney, Agent, or Firm* — Sprinkle IP Law Group

(57) ABSTRACT

Systems and methods that allow configuration of a path at a network device using a representative user visible interface for that path are disclosed. A feature of this path may thus be configured using this representative user visible interface through a configuration interface of the network device. When a feature for the path is configured by reference to its corresponding representative user visible interface, the interfaces of that path that correspond to that feature can be determined and the configuration for that feature can be applied to interfaces of the path, even where those interfaces reside in different subdomains.

17 Claims, 6 Drawing Sheets

PATH CONFIGURATION IN A NETWORK DEVICE USING A USER VISIBLE REPRESENTATIVE INTERFACE

BACKGROUND

In network devices that perform packet forwarding in a network (e.g., routers, switch, etc.), forwarding domains are often used. These forwarding domains can include: (1) a packet processing engine and (2) various software/firmware elements (collectively "the software") to process or control the flow of packets through the network device. In many cases, the software is designed so that it operates as if it has sole access over the entire network device, including the (physical) front panel and its (physical) ports. Accordingly, some network devices boot up with only one forwarding domain. As such, a deployment that involves the forwarding of packets between one or more forwarding domains requires installing separate network devices (e.g., switch units or "boxes") in a rack and patching the network devices together via their respective front panels. Such arrangements consume rack space and can consume significant amounts of power.

To remedy this situation, network devices which provide support for multiple forwarding domains have been developed where these multiple domains can co-exist in a single network device. Infrastructure on a network device can thus allow for the instantiation and support of multiple co-existing, independently operating forwarding domains using the same hardware of the network device.

A network device can thus be configured with several concurrently operating subdomains (e.g., where a subdomain is a forwarding domain operating on the device to forward packets) comprising the software that controls the underlying packet processor hardware in a particular I/O module (or set of modules), and related packet processing data such as forwarding tables. These types of subdomains can be configured according to customer configuration information (or certain defaults that may, for example, be particular to that network device) that specifies connections (data paths, or just paths) on the network device. Configuration information can be input from a user (e.g., via a command line interface, CLI, or a file downloaded from a central controller) and may specify connections to establish paths between subdomains by referencing front panel interfaces and virtual ports.

The configuration of the interfaces (e.g., physical or virtual) of a network device in accordance with the implementation of these subdomains may be quite complex. This complexity may be especially prevalent with respect to the configuration of paths comprising interfaces (e.g., ports), where those paths may include interfaces across subdomains. Part of the complexity of configuring a path (e.g., one or more physical or virtual interfaces in one or more subdomains) results from the need to apply desired configurations across all of the multiple interfaces that make up such a path. This can be confusing and cumbersome to the users that must use a configuration interface such as a CLI (or similar instructions within a file) to configure each individual interface of the path (e.g., both virtual and physical). The user is required to know which interfaces accept particular configurations and must ensure that the same configuration is applied across all interfaces of the path. Not only is this complex, but it is tedious. The same configuration may need to be repeatedly entered for each interface of the path and across each subdomain which the path spans, even if that configuration is the same for each interface.

What is desired then, is to provide a simple and straightforward method for users to configure the features of a path, including those paths that may include multiple (e.g., virtual) interfaces in multiple subdomains.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
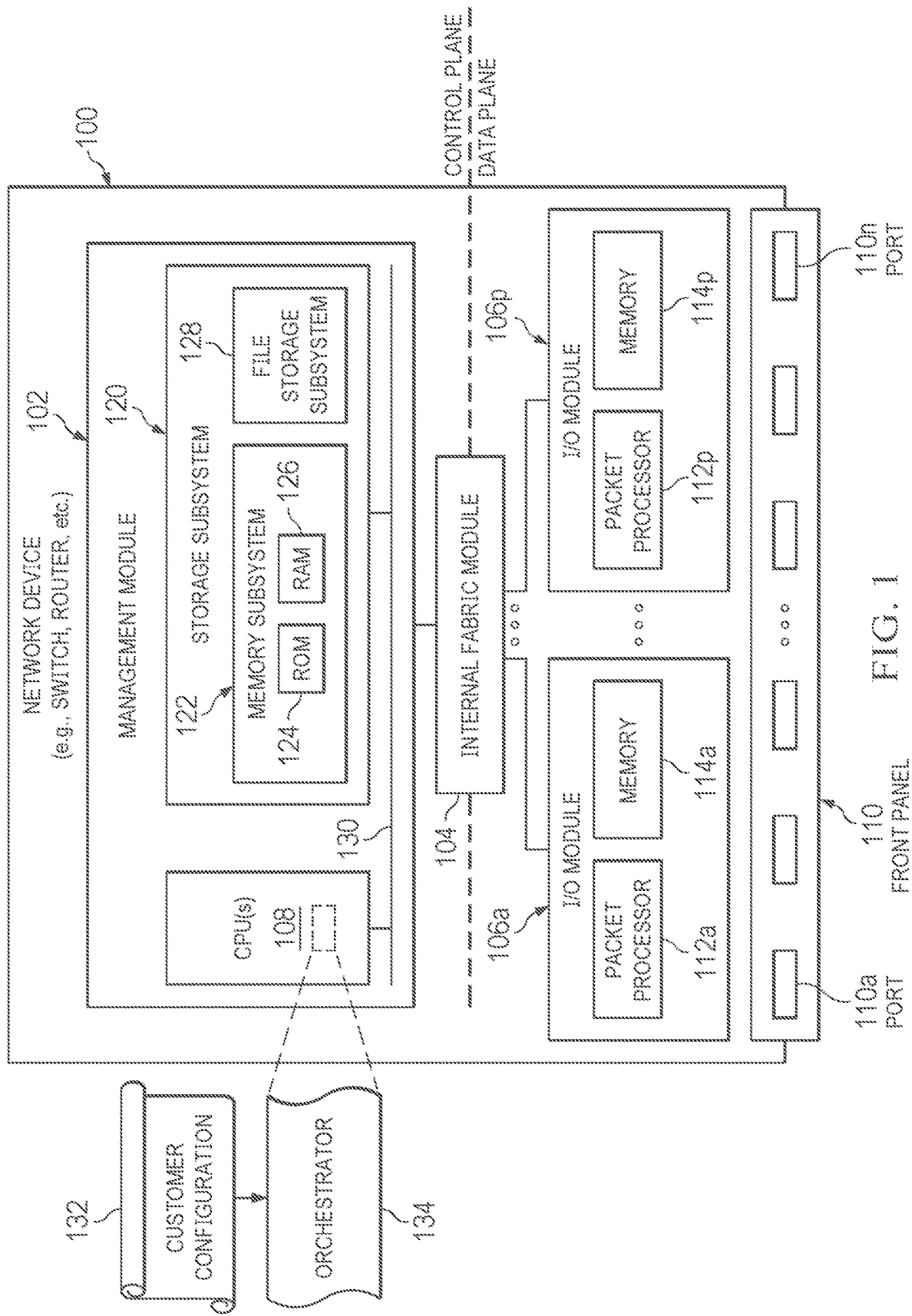
FIG. 1 is a system level block diagram of a network device in accordance with the present disclosure.

As discussed, forwarding domains are used network devices that perform packet forwarding in a network, where those forwarding domains can include a packet processing engine comprising hardware, such as a main chip (e.g., ASIC or FPGA, including a crosspoint as detailed herein) and supporting chips (e.g., memory, external PHYs, etc.), and various software/firmware elements (collectively "the software") to process or control the flow of packets through the network device. The software used with a forwarding domain is designed so that it operates as if it has sole access over the entire network device, including the (physical) front panel and its (physical) ports. Some network devices thus utilize a single forwarding domain. As such, a deployment that involves the forwarding of packets between one or more forwarding domains requires installing separate network devices and patching the network devices together via their respective front panels. Such arrangements consume rack space and can consume significant amounts of power.

Network devices which provide support for multiple forwarding domains that can co-exist in a single network device have also been developed. Infrastructure on a network device can thus allow for the instantiation and support of multiple co-existing, independently operating forwarding domains using the same hardware of the network device.

Each forwarding domain may operate concurrently and independently of the other forwarding domains in a network device. Accordingly, certain network devices include an orchestrator (e.g., software) to support operation of multiple independent forwarding domains by configuring (e.g., programming) the hardware in the network device in accordance with a customer configuration. The term "subdomain" may be used to refer to each forwarding domain that is instantiated and operating in the network device to process packets.

A network device can thus be configured with several concurrently operating subdomains comprising the software that controls the underlying packet processor hardware in a particular I/O module (or set of modules), and related packet processing data such as forwarding tables. These types of subdomains can be configured according to customer configuration information (or certain defaults that may, for example, be particular to that network device) that specifies connections (data paths, or just paths) on the network device. Configuration information can be input from a user (e.g., via a command line interface, CLI, or a file downloaded from a central controller) and may specify connections to establish paths between subdomains by referencing front panel interfaces and virtual ports.

In accordance with embodiments, each subdomain can be associated with a software representation of a front panel (referred to herein as virtual front panel) comprising software representations of physical I/O ports (referred to herein a virtual ports) on the subdomains. Virtual front panels provide their respective subdomains with their own view, or logical instance, of a physical front panel. The actual physical front panel of the network device itself can be associated with its own software representation comprising a software representation of physical ports.

An orchestrator (also referred to as a central agent) can configure the hardware in each subdomain, as set forth in the configuration information. In some embodiments, for example, each subdomain can be associated with one or more software agents that are responsible for configuring the hardware that constitutes the subdomain. The agents can configure the I/O hardware (e.g., port speed, etc.) on the chips associated with a given subdomain, for example, when the network device boots up. This configuration information can specify connections in the network device in terms of the virtual front panels and their corresponding virtual ports. The orchestrator can verify the connections are proper and configure hardware in the network device to make the specified connections. The presence of subdomains in conjunction with an orchestrator can facilitate the formation of topologies that would otherwise require connecting together multiple single-domain network devices.

As can be seen from the above, then, the configuration of the interfaces (e.g., physical or virtual) of a network device in accordance with the implementation of these subdomains may be quite complex. This complexity may be especially prevalent with respect to the configuration of paths comprising interfaces (e.g., ports), where those paths may include interfaces across subdomains. Part of the complexity of configuring a path (e.g., one or more physical or virtual interfaces in one or more subdomains) results from the need to apply desired configurations across all of the multiple interfaces that make up such a path. This can be confusing and cumbersome to the users that must use a configuration interface such as a CLI (or similar instructions within a file) to configure each individual interface of the path (e.g., both virtual and physical). The user is required to know which interfaces accept particular configurations and must ensure that the same configuration is applied across all interfaces of the path. Not only is this complex, but it is tedious. The same configuration may need to be repeatedly entered for each interface of the path and across each subdomain which the path spans, even if that configuration is the same for each interface.

What is desired then, is to provide a simple and straightforward method for users to configure the features of a path, including those paths that may include multiple (e.g., virtual) interfaces in multiple subdomains. Embodiments of the systems and methods disclosed herein may do just that by allowing a user to configure a path (including paths comprising interfaces that span multiple subdomains) using a representative user visible interface for the path. The representative user visible interface for a path may be, for example, an (identifier of) a physical front panel port associated with the path. A user can thus configure a feature of a path using this representative user visible interface through a configuration interface (e.g., the CLI) of the network device. The user may also be prevented from viewing, accessing, or configuring individual interfaces of the path through the configuration interface (e.g., the CLI of the network device). When the user configures a feature for a path by reference to its corresponding representative user visible interface, the interfaces of that path that correspond to that feature can be determined and the configuration for that feature can be applied to those interfaces of the path, even where those interfaces reside in different subdomains.

Additionally, only configurations for that feature which are compatible with the capabilities of (e.g., all of) the interfaces comprising that path may be accepted through the configuration interface. For example, if one interface of the path may be configured with a speed of 10 Gbps or 25 Gbps while another interface of the path may only be configured with a speed of 25 Gbps, any attempt to configure the path with a speed other than 25 Gbps may be rejected (e.g., the CLI may return an error when such a configuration is attempted).

In one embodiment, the presentation or acceptance of capabilities for a feature is accomplished by a capabilities resolver that resolves the capabilities of the feature that are available across interfaces of a path (or a subset of those interfaces associated with that particular feature). Specifically, when a path is established or (reconfigured) the available capabilities of each interface in the path may be determined for each feature (e.g., that may be configurable for a path). For each feature, the capabilities resolver can then evaluate the available capabilities of each interface to determine those capabilities for the feature that are available across all the interfaces of the path. These available capabilities for each feature can be stored in the system database in association with that path (e.g., and in association with the representative user visible interface for that path). Only these available capabilities may be advertised for the representative user visible interface though through the configuration interface, and any attempts by a user to configure a feature according to an unavailable capability may return an error.

Similarly, a user may check on a status (e.g., a link status) of the path through the configuration interface using the representative user visible interface for the path. In particular, a user may submit a status request through the configuration interface specifying the representative user visible interface. Because such a status may only exist with respect to particular interfaces of the path that may only exist in certain subdomains, a status replicator may be provided to determine a status to associate with a path (and the user visible interface for the path) based on statuses reported for interfaces from each subdomain that includes interfaces in the path.

Specifically, a software agent in each subdomain may monitor the status of interfaces (e.g., in the path) in that subdomain, and provide the statuses of those interfaces to the status replicator. The status replicator may apply a status determination strategy to the statuses reported for interfaces of the path from each subdomain to determine the status to associate with the representative user visible interface for the path, where that status determination strategy may be based on the interfaces comprising that path or other configuration information. For example, the strategy may be to simply copy a status reported for a particular interface of the path to associate that reported status with the representative user visible interface. In this manner, a status may be associated with the representative user visible interface for a path and returned to (or otherwise accessed by) the user through the configuration interface, even when such a status may not actually be available for, or even germane to, that actual interface corresponding to the representative user visible interface for the path.

As discussed, each subdomain can be associated with one or more software agents that are responsible for configuring the hardware that constitutes the subdomain. Embodiments that configure interfaces of a path based on the representative user visible interface may thus utilize a central agent that facilitates configuration of these interfaces using the software agents of each subdomain that includes those interfaces. This central agent may establish configuration information that includes a mapping between the user visible interface for the path, and the interfaces that comprise the path.

These software agents of each subdomain can report the interfaces of the underlying hardware of the subdomain, and the features or capabilities of those interfaces, to the central agent. The central agent may determine one or more forwarding models for a path based on the interfaces, features or capabilities reported by the software agents of each subdomain. A forwarding model (e.g., for a feature) may maintain a (e.g., reduced) set of interfaces of the path that may be configured when that corresponding feature is configured by a user in the configuration interface using the representative user visible interface for the path. The set of interfaces and features reported by the software agent of the subdomain may also be utilized by the central agent to configure a table for these software agents, where that table maps the representative user visible interface of the path to underlying hardware resources of the subdomain associated with a feature, such that when a feature configuration is changed for that representative user visible interface the software agent of the subdomain may utilize that table to modify the underlying hardware resource of the subdomain to implement that feature configuration for that interface.

Accordingly, when the user configures a feature for the path using the representative user visible interface in the configuration interface, this configuration may be received at the central agent. The central agent may determine which interfaces of which subdomains need to be configured for that feature using a forwarding model associated with that path (e.g. using a forwarding model associated with the feature for that path), and how that feature needs to be configured for that interface. That configuration can be communicated to the software agent responsible for those features in each subdomain that includes those interfaces. For example, the configuration for the feature may be stored in the system database where the software agent may detect that the configuration for the feature for the interface applies to an interface in the subdomain corresponding to that software agent has changed. The software agent can then configure the interface as specified in its configuration table to modify the underlying hardware of that subdomain to implement the configuration for that feature for that interface (e.g., the software agent can then configure the feature in hardware via the interface as specified in its configuration table). In this manner, the interfaces of the path across subdomains may be individually configured according to that feature based on a received configuration of the path specifying the representative user visible interface.

Embodiments as disclosed thus provide a simplified way for users to configure paths, and apply this configuration to interfaces on the path, using a single representative user visible interface, even when the interfaces of the path reside on different subdomains. Accordingly, embodiments may thus provide the advantages of hiding the complexity of configuring these paths and providing a configuration mechanism that is both less confusing—users will no longer need to know or guess which config should be applied on which interface, and less cumbersome—by avoiding the need for a user to repeatedly configure multiple interfaces in the same manner. Moreover, embodiments may allow this configuration to be enabled at an individual data path level whereby users can control which interface in the path is visible.

Turning to FIG. 1 is a block diagram depicting an architecture of one embodiment of a network device (e.g., a router, switch, firewall or the like) adapted to configure a path using a representative user visible interface is disclosed. Network device 100 can include a management module 102, an internal fabric module 104, a number of I/O modules 106a-106p, and a physical front panel 110 comprising I/O ports (physical interfaces) 110a-110n. Management module 102 can constitute the control plane (also referred to as a control layer or simply the CPU) of network device 100 and can include one or more management CPUs 108 for managing and controlling operation of network device 100 in accordance with the present disclosure. Each management CPU 108 can be a general-purpose processor that operates under the control of software stored in a memory such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128, which represent non-transitory computer-readable storage media that can store program code (e.g., orchestrator or central agent 134) or data, which when executed by one or more management CPUs 108, can cause one or more management CPUs 108 to perform operations in accordance with embodiments of the present disclosure.

Memory subsystem 122 can include a number of memories such as main RAM 126 for storage of instructions and data during program execution, and ROM (read-only memory) 124 in which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista Extensible Operating System (EOS®), which is a fully programmable and highly modular, Linux-based network operating system, developed and sold/licensed by Arista Networks, Inc. of Santa Clara, California. Other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple busses.

Internal fabric module 104 and I/O modules 106a-106p collectively represent the data plane of network device 100 (also referred to as data layer, forwarding plane, etc.). Internal fabric module 104 represents interconnections among the various other modules of network device 100. Each I/O module 106a-106p can include a packet processing pipeline, logically represented by respective packet processors 112a-112p and memory hardware 114a-114p, to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable gate array), switch chips, digital processing unit, and the like. Memory hardware 114a-114p can include lookup hardware, including for example, content addressable memory such as TCAMs (ternary CAMs) and auxiliary memory such as SRAMs (static random access memory). The forwarding hardware in conjunction with the lookup hardware can provide (e.g., wire speed) decisions on how to process ingress packets and outgoing packets for egress. In accordance with some embodiments, some aspects of the present disclosure can be performed wholly within the data plane.

Network device 100 can be configured with multiple concurrently instantiated, independently operating forwarding domains. Each forwarding domain can operate concurrently and independently of the other forwarding domains. In some embodiments, for example, network device 100 can include a central agent or orchestrator 134 to support operation of multiple independent forwarding domains by configuring (e.g., programming) the hardware in the network device in accordance with (e.g., customer or user) configuration 132. Going forward the term "subdomain" is used to refer to each forwarding domain that is instantiated and operating in the network device to process packets.

Figure 2:
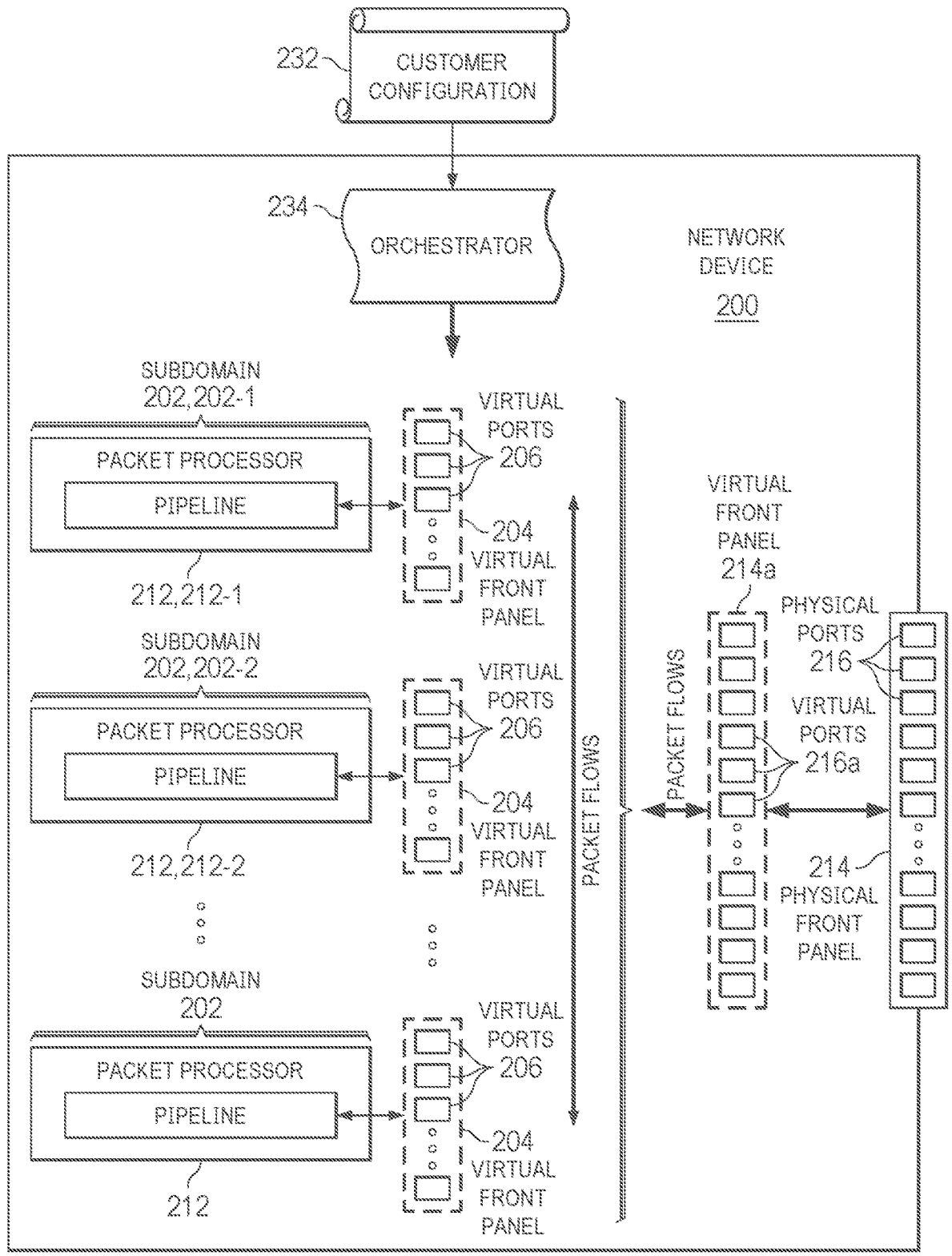
FIG. 2 is a diagrammatic representation of multiple forwarding domains (subdomains) in accordance with the present disclosure.

FIG. 2 is a generalized diagrammatic representation of multiple subdomains in one embodiment of a network device. As discussed, network device 200 can be configured with several concurrently operating subdomains 202. A subdomain can comprise the software that controls the underlying packet processor hardware (212) in a given I/O module (e.g., 106a) and related packet processing data such as forwarding tables. Specifically, each operating subdomain 202 may be implemented on corresponding packet processing hardware of the network device. In particular, the packet processing hardware corresponding to an operating subdomain 202 may comprise circuitry (e.g., one or more integrated circuits, chips, FPGAs, etc., or portions thereof) that is different from the circuitry used for a different subdomain 202. For instance, subdomain 202-1 can be instantiated on packet processor 212-1 to forward packets according to a first forwarding table. Subdomain 202-2 can be instantiated on packet processor 212-2 to forward packets according to a second forwarding table different from the first forwarding table, and so on. Subdomains are not necessarily packet forwarding engines, but can be configured for general packet processing.

In some embodiments, customer configuration information 232 can specify connections (paths) between subdomains 202 on network device 200. Configuration information 232 can be input from a user (e.g., via a command line interface, CLI). In some embodiments, configuration information 232 can be a file downloaded from a central controller, and so on. Configuration information 232 can specify connections to establish data paths between subdomains by referencing their virtual front panels and virtual ports.

Each subdomain 202 can be associated with a software representation of a front panel (referred to herein as virtual front panel 204) comprising software representations of physical I/O ports (referred to herein a virtual ports 206) on the subdomains; e.g., serializer/de-serializer circuits (serdes). Virtual front panels 204 provide their respective subdomains 202 with their own view, or logical instance, of an associated physical front panel. In accordance with the present disclosure, the actual physical front panel 214 of the network device 200, itself, can be associated with its own software representation (shown in FIG. 2 as virtual front panel 214a) comprising a software representation of physical ports 216 (shown in FIG. 2 as virtual ports 216a).

Central agent (or orchestrator) 234 can configure the hardware in each subdomain, as set forth in the configuration information 232, for example. In some embodiments, for example, each subdomain can be associated with one or more software agents that are responsible for configuring the hardware that constitutes the subdomain. The agents can configure the I/O hardware (e.g., port speed, etc.) on the chips associated with a given subdomain, for example, when the network device boots up.

Configuration information 232 can specify connections in the network device in terms of the virtual front panels and their corresponding virtual ports. Central agent 234 can verify the connections are proper and configure hardware in network device 200 to make the specified connections. The presence of subdomains 202 in conjunction with central agent 234 can facilitate the formation of topologies that would otherwise require connecting together multiple single-domain network devices.

The use of virtual front panel ports 216a obviates the need for coordination among subdomains to gain access to front panel ports 216. For example, subdomain 202-1 can send/receive packets on a given port (on its virtual front panel) without requiring coordination with other subdomains to gain access to that port because each subdomain has its own view of a front panel (namely the virtual front panel) with its own set of ports (namely the virtual ports). Central agent 234 can ensure that connections among virtual ports are proper. Absent the use of virtual front panels and virtual ports, if subdomain 202-1 wants to communicate over physical port 216 on the physical front panel 214 of the network device 200, some form of device-wide coordination in the network device would be required to ensure that no other subdomain is using that physical port.

Figure 3A:
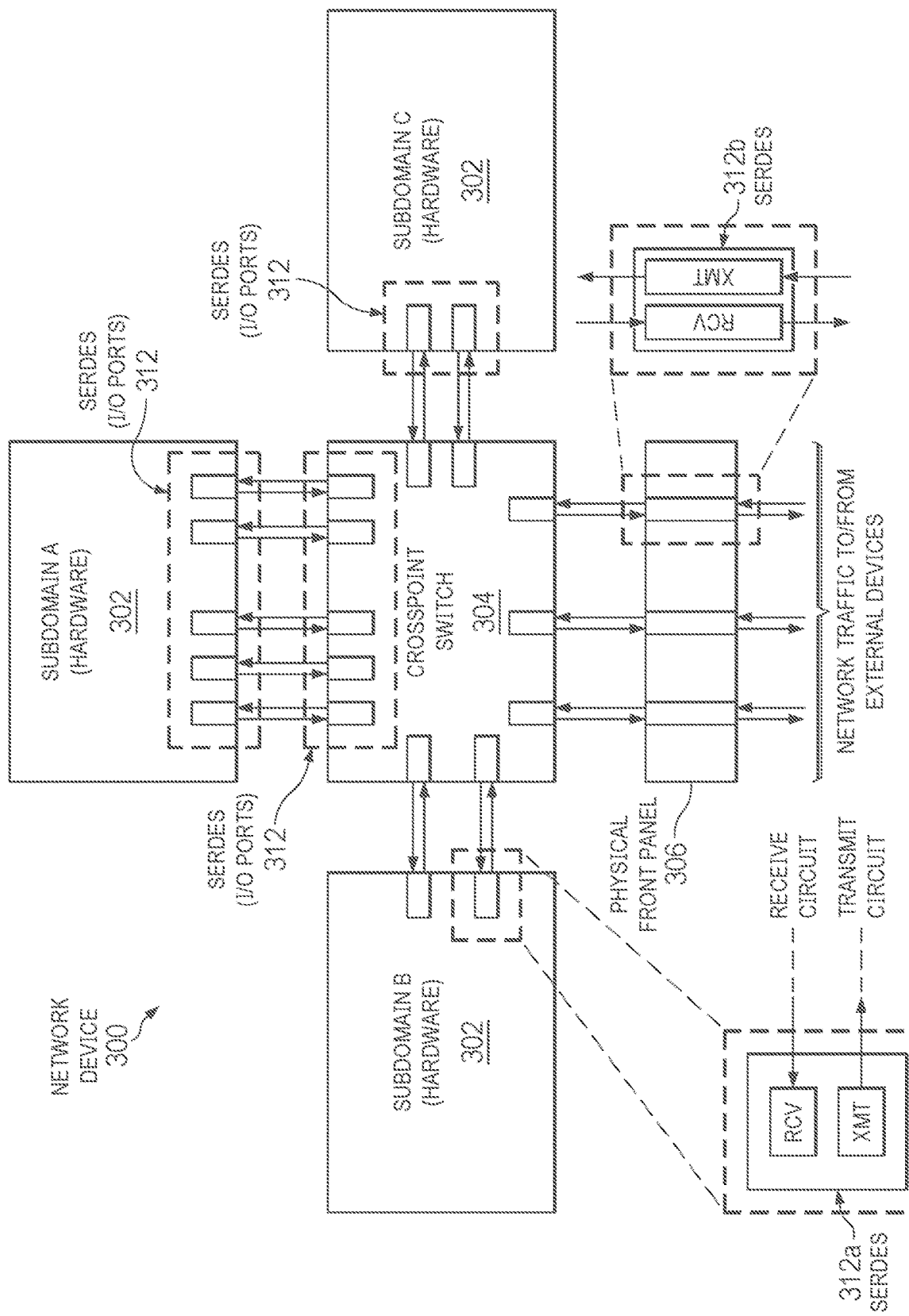
FIGS. 3A and 3B are diagrammatic representations of physical and virtual mapping in subdomains in accordance with the present disclosure.

FIG. 3A is a diagrammatic representation of a network device 300 showing an illustrative configuration of independent, concurrently operating subdomains 302. A physical front panel 306 can provide connectivity to devices outside of network device 300. A crosspoint switch 304, or other suitable cross-connect circuitry, comprising a set of ports and circuitry that can connect together its ports. Crosspoint switch 304 can connect together different subdomains that are connected to the crosspoint switch. The crosspoint switch can connect a subdomain to the physical front panel, and so on.

Each subdomain 302 comprises its own underlying packet processing hardware and software for controlling/managing the hardware. It will be appreciated that the underlying hardware can be any packet processing hardware, and is not necessarily limited to a fully L2 or L3 capable packet processing engine. A subdomain can be characterized by the following:

forwarding plane—A subdomain defines a forwarding plane that refers to the software and data for managing the flow of packets.
  hardware zone—This refers to the group of hardware chips and associated PCB (printed circuit board) traces and passive components that fall under the control of the forwarding plane.
  primary chip—The hardware zone includes at least one primary chip that provides a primary source of packet processing functionality. Primary chips can be, but are not limited to ASICs, crosspoint switches, and FPGAs.

Hardware that constitutes subdomains 302, crosspoint switch 304, and front panel 306 can include physical serializer/de-serializer circuits (serdes, I/O ports) 312 for transmitting and receiving data packets. FIG. 3A shows details of a serdes 312a on a chip (e.g., FPGA) in subdomain B and details of a serdes 312b on physical front panel 306. In some embodiments, for example, each serdes comprises separate receive and transmit circuits which can operate independently of each other (commonly referred to as full-duplex operation). The subdomain can receive signals (data) on the receive signal line of the receive circuit. Conversely, the subdomain can transmit signals on the transmit line (independently and separately from the receive line) of the transmit circuit. It will be appreciated that in some embodiments, some serdes can operate in half-duplex mode. Serdes 312 can be connected to each other (e.g., via electrical or optical connections, etc.).

Figure 3B:
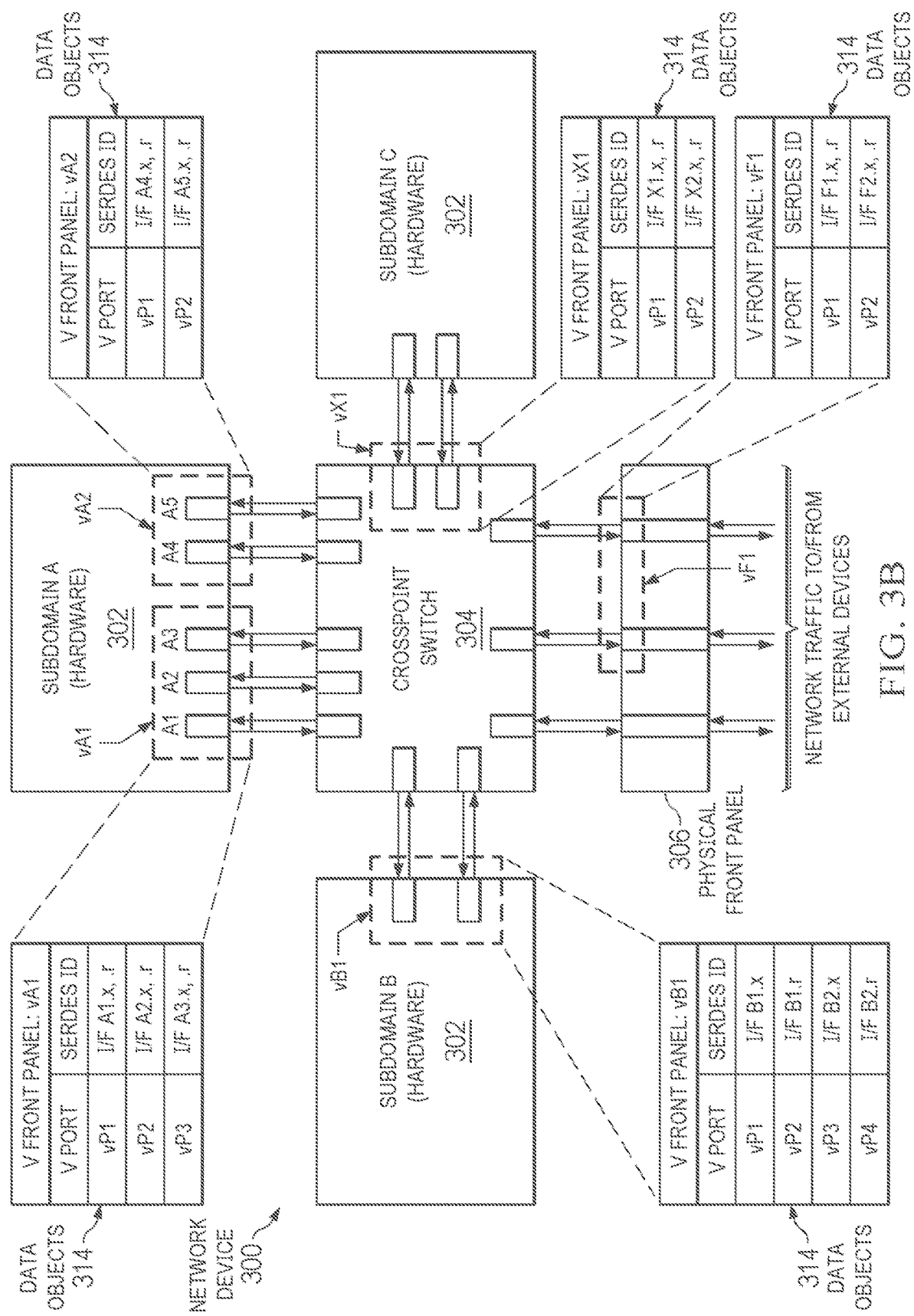

FIG. 3B shows one example of the instantiation of software defined front panels and software defined ports (referred to herein as virtual front panels and virtual ports). A virtual front panel is a grouping of serdes of a subdomain; for example, subdomain B is associated with a virtual front panel vB1. In accordance with the present disclosure, the crosspoint switch 304 can also be associated with a virtual front panel. FIG. 3B, for instance, shows a virtual front panel vX1 associated with the crosspoint switch. Likewise, in accordance with the present disclosure, the physical front panel 306 can be associated with a virtual front panel. The example in FIG. 3B shows a virtual front panel vF1 associated with the physical front panel. Not all serdes are necessarily associated with a virtual front panel. FIG. 3B, for instance, shows an interface (e.g., a maintenance interface) on physical front panel 306 that is not associated with a virtual front panel. It will be appreciated that in some embodiments, a subdomain can be associated with more than one virtual front panel. FIG. 3B, for instance, shows that subdomain A is associated with two virtual front panels: vA1, vA2.

Configuration information that describes the virtual front panels and the mapping information between the virtual ports and physical serdes can be stored in memory of the network device 300, and are collectively represented in FIG. 3B as data objects 314. Information about a virtual front panel can include a description of the capabilities of a feature associated with virtual front panel; e.g., speed, forwarding error correction (FEC), auto-negotiate capability, and other configurations. In some embodiments, configuration information about virtual front panels can be stored in data objects separate from the data objects that store the mapping information. In some embodiments, for example, the network device can include a common database that stores the configuration information for each virtual front panel. On the other hand, each serdes can be associated with a data structure that contains configuration and state information for that serdes; e.g., UP/DOWN status, data speed, etc. The data structure for a given serdes can include mapping information that identifies the virtual front panel and virtual port name that the serdes corresponds to. FIG. 3B, for example, shows that subdomain B comprises physical serdes B1, B2. A virtual front panel vB1 is defined as one that logically contains serdes B1, B2. It will be understood that configuration information for virtual front panel vB1 can be stored in a database of virtual front panels along with other virtual front panels. Although not shown, a data structure for serdes B1 can include configuration and state information for B1 plus information that maps or otherwise relates B1 to virtual front panel vB1 and to a virtual port. In this example, the transmit and receive circuits are mapped to different virtual ports, namely vP1 and vP2 respectively. Likewise for serdes B2, the data structure that contains configuration and state information for B2 can include information that maps the transmit and receive circuits of serdes B2 to virtual front panel vB1 and respective virtual ports vP3 and vP4.

FIG. 3B shows that in some embodiments the transmit circuit and receive circuit of each serdes (see serdes detail in FIG. 3A) can be individually mapped to respective virtual ports. FIG. 3B shows that both the transmit and receive circuits of serdes A1 are mapped to virtual port vP1 of front panel vA1, and likewise for the transmit and receive circuits of serdes A2 and A3. On the other hand, virtual front panel vB1 illustrates an example of separately mapped transmit and receive circuits. The figure shows that the transmit circuit of serdes B1 is mapped to virtual port vP1 of front panel vB1 and the receive circuit of serdes B1 is mapped to virtual port vP2 of front panel vB1. The figure shows that the transmit and receive circuits of serdes B2 are likewise mapped to separate virtual ports, namely vP3 and vP4.

The names of the virtual front panels and virtual ports serve as handles (labels) to circuit locations on the subdomain, namely the actual physical serdes. For example, the handle vA1.vP1.x can be understood to refer to the transmit circuit of physical serdes A1 in subdomain A1, the handle vX1.vP1.x can be understood to refer to the transmit circuit of a physical serdes X1 in crosspoint switch 304, the handle vF1.vP3.R can be understood as representing the receive circuit of a physical serdes F3 in physical front panel 306, and so on. Handles facilitate the process of configuring connections to establish data paths between the subdomains, crosspoint switch, and physical front panel because they allow customers (users) to specify the connections without having to learn and remember various specific naming conventions of the underlying serdes. Users do not have to know the specific hardware blocks involved, and in general do not have to know the internal structures and organization of the network device.

Thus, a network device can access configuration information to configure and connect subdomains in the network device. In some embodiments, the configuration information can include subdomain configuration information and connection configuration information. The subdomain configuration information can be hardcoded in the network device (e.g., stored on a ROM device, on an FPGA, and so on). The subdomain configuration information can define subdomains in terms of port configuration (e.g., speed, FEC, etc.) of the serdes of the subdomain. The connection configuration information can specify connections between subdomains and connections between subdomains and the physical front panel of the network device. In some embodiments, the connection configuration information can come from one or more configuration files stored on the network device or downloaded from a central controller. In other embodiments, the connection configuration information can come from a customer (user) via a CLI (command line interface) or other suitable user interface.

As part of the process of booting up, the network device can instantiate one or more subdomains in accordance with the accessed subdomain configuration information. The network device can configure (e.g., program) the hardware (e.g., packet processors or other circuits) that constitute each subdomain in accordance with the configuration information. In some embodiments, for example, one or more configuration agents that execute in the network device can program the hardware (e.g., ASIC, FPGA, tables, supporting ICs, etc.) of each packet processor in accordance with the subdomain configuration information to instantiate a subdomain.

The network device (e.g., the central agent) can instantiate virtual front panels for the various blocks in the network device, including but not limited to the subdomains, any crosspoint switches, and the physical front panel. Each virtual front panel represents a group of physical serdes on the component that the virtual front panel is associated with. In some embodiments, virtual front panels can be instantiated or otherwise defined in accordance with a customer configuration file; for example, as part of booting up the network device. In other embodiments, virtual front panels can be instantiated at runtime in response to commands received from a user via a suitable user interface such as a CLI. The configuration information or user command can specify a virtual front panel by naming the virtual front panel and identifying the block (e.g., subdomain, crosspoint switch, physical front panel) to be associated with that virtual front panel. The configuration information can further specify which serdes in that block belong to that virtual front panel and assign virtual ports (names) to those serdes.

The network device (e.g., the central agent) can connect together the virtual ports defined among the virtual front panels. In accordance with the present disclosure, connections (data paths, or just paths) between the physical serdes of the subdomains, crosspoint switch, and physical front panel can be specified in terms of the virtual ports to which the serdes are mapped, and in particular to the serdes handles (e.g., virtual front panel identifier and virtual port identifier). Connection configuration instructions can specify endpoints of a connection using the handles described above. In accordance with the present disclosure, a service such as a central agent that executes on the network device can use mapping information in the data objects 314 to identify the physical serdes corresponding to a given handle. Referring to FIG. 3B, for instance, a reference to the handle vA2.vP1.x would map to the transmit circuit of physical serdes A4 on subdomain A. A reference to the handle vB1.vP4 would map to the receive circuit on physical serdes B2 on subdomain B, and so on.

The central agent can configure the hardware in the network device to establish a connection (data path) between the two serdes. In some embodiments, virtual ports can be connected in accordance with instructions in a customer configuration file; for example, as part of booting up the network device. In other embodiments, virtual ports can be connected at runtime in response to instructions (commands) received from a user via a suitable user interface such as a CLI or in response to the user providing a configuration file.

As can be seen from the above, then, the configuration of the interfaces (e.g., physical or virtual) of a network device in accordance with the implementation of these subdomains may be quite complex. This complexity may be especially prevalent with respect to the configuration of paths comprising interfaces (e.g., ports), where those paths may include interfaces across subdomains. Part of the complexity of configuring a path (e.g., one or more physical or virtual interfaces of one or more subdomains) results from the need to apply desired configurations across all of the interfaces that make up such a path (where those interfaces may reside in different subdomains). This can be confusing and cumbersome to the users that must use a configuration interface such as a CLI (or similar instructions within a file) to configure each individual interface of the path (e.g., both virtual and physical). The user is required to know which interfaces accept particular configurations and must ensure that the same configuration is applied across all interfaces of the path.

Embodiments of the systems and methods disclosed herein may allow a user to configure a path (including paths comprising interfaces that span multiple subdomains) using a representative user visible interface for the path. The representative user visible interface for a path may be, for example, an (identifier of) a physical front panel port associated with the path (or may be an identifier of a virtual front panel port associated with the physical front panel port). A user can thus configure a feature of a path using this representative user visible interface through a configuration interface (e.g., the CLI) of the network device. The user may also be prevented from viewing, accessing, or configuring individual interfaces of the path through the configuration interface (e.g., the CLI of the network device). When the user configures a feature for a path by reference to its corresponding representative user visible interface, the interfaces of that path that correspond to that feature can be determined and the configuration for that feature can be applied to those interfaces of the path, even where those interfaces reside in different subdomains. Additionally, only configurations for that feature which are compatible with the capabilities of (e.g., all of) the interfaces comprising that path may be accepted through the configuration interface.

Figure 4:
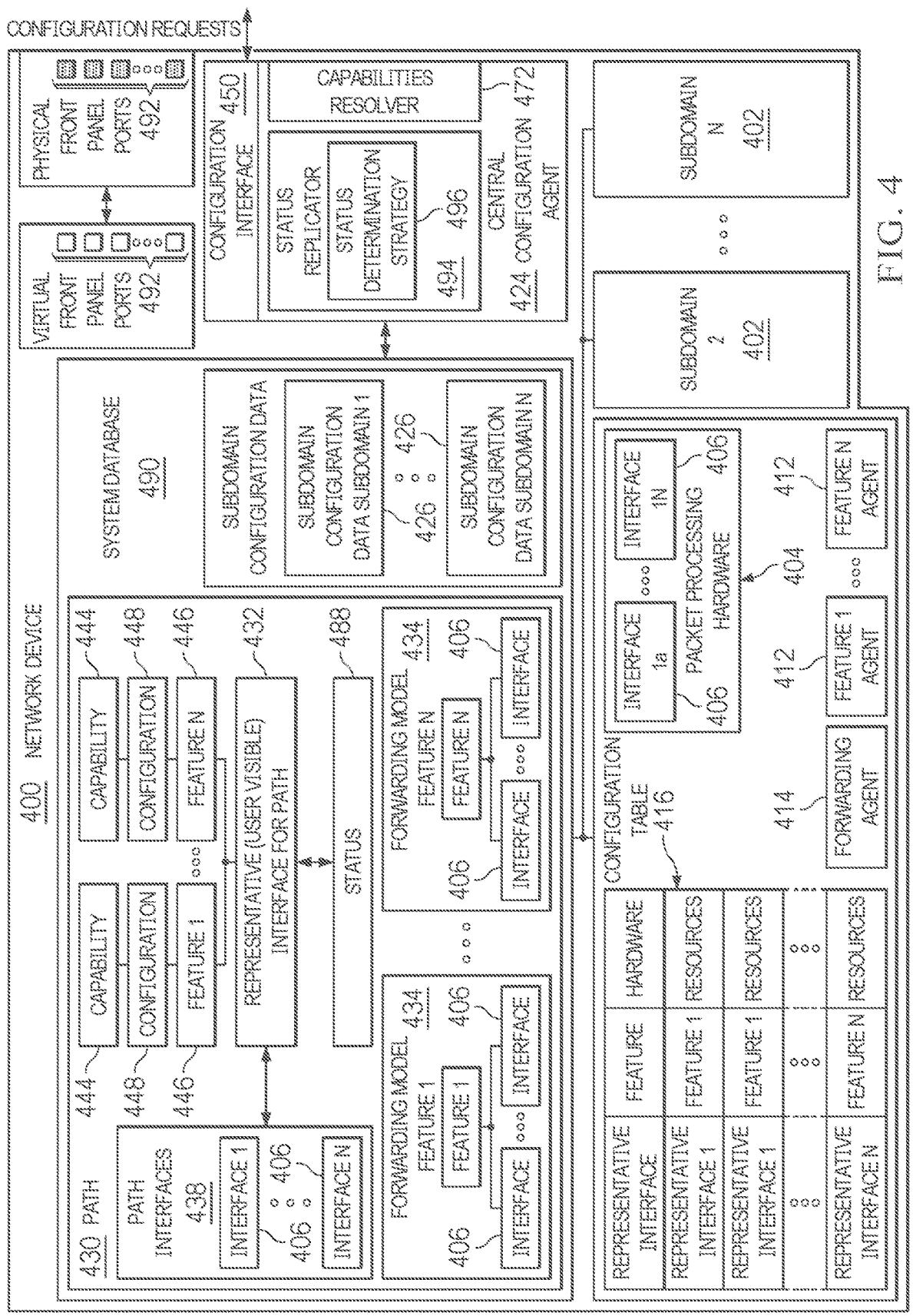
FIG. 4 is a block diagram depicting one embodiment of a network device adapted for configuring a path using a representative user visible interface.

Moving then to FIG. 4, one embodiment of an architecture for a network device adapted to allow a user to configure a path (e.g., a feature for a path) using a representative user visible interface for the path. In particular, as discussed above, a number of subdomains 402 may be configured on network device 400, where each of the subdomains 402 may include underlying packet processing hardware 404. The packet processing hardware 404 comprising a subdomain 402 may include a number of interconnected interfaces 406 (e.g. that correspond to virtual ports or physical ports associated with the underlying packet processing hardware 404 for that subdomain 402).

One or more paths 430 for packet processing may be configured at the network device 400, where those paths 430 may comprise a set 438 of interfaces 406 (or path interfaces 438) associated with one or more subdomains 402. In other words, the path interfaces 438 comprising the path 430 may span one or more subdomains 402 implemented on the network device 400 such that, for example a first interface 406 of the path interfaces 438 of path 430 may be in one subdomain 402a and a second interface of the path interfaces 438 of path 430 may be in a second (e.g., different) subdomain 402n.

Such paths 430 may be defined, for example, through configuration interface 450 offered by the network device 400 such as a CLI or the like such that configuration for path 430 is stored in system database 490 by central configuration agent 450. Each path 430 may also have a representative user visible interface 432 associated with it. That representative user visible interface 432 may be selected as the (identifier of) the front panel port 492 (or virtual front panel port 492a associated with that front panel port 492) associated with that path 430. Central configuration agent 450 may thus map the representative user visible interface 432 to the set of interfaces 438 comprising the path 430 in system database 490. A set of features 446 (e.g., speed, FEC, auto-negotiate capability, etc.) may thus be configured in accordance with path 430, where each of these features 446 may have an associated configuration 448. For example, a feature 446 may be speed and a configuration for the feature of speed may be (a value of) 10 Gbps or (a value of) 25 Gbps.

Configuration interface 450 may be adapted to perform various functionality in accordance with path 430 based on configuration commands specifying representative user visible interface 432. For example, a user can configure a feature 446 for a path 430 using this representative user visible interface 432 through the configuration interface 450 of the network device 400. Specifically, a configuration for a feature 446 of path 430 may be specified in accordance with representative user visible interface 432 through configuration interface 450 and one or more interfaces 406 comprising path 430 may be configured according to the specified configuration 448 to implement the specified configuration 448 in accordance with path 430. In some embodiments, only configurations for a feature which are compatible with the capabilities of (e.g., all of) the interfaces 406 comprising that path 430 may be accepted through configuration interface 450. The user may likewise be prevented from viewing, accessing, or configuring individual (e.g. internal) interfaces 406 of the path 430 (e.g., interfaces other than representative user visible interface 432) through the configuration interface 450. In this manner, configuration for features 446 of path 430 may, if desired, be restricted to the use of the representative user visible interface 432. Similarly, a user may check on status 488 (e.g., a link status) of path 430 through configuration interface 450 using representative user visible interface 432 for path 430. In particular, a user may submit a status request through configuration interface 450 specifying representative user visible interface 432 and such as status 488 may be returned to the user through the interface 450.

When a user configures a feature 446 for path 430 by reference to its corresponding representative user visible interface 432, interfaces 406 of that path 430 that correspond to that feature can be determined by central configuration agent 424 and the configuration for that feature can be applied to those interfaces 406 of path 430 through central configuration agent 424, even where those interfaces 406 reside in different subdomains.

To allow such a configuration utilizing a representative user visible interface 432 each subdomain 402 implemented in network device 400 can be associated with one or more software agents that are responsible for configuring the packet processing hardware 404 that constitutes the subdomain 402. The software agents of a subdomain 402 can configure interfaces 406 of packet processing hardware 404 associated with that subdomain 402, for example, when the network device boots up or dynamically during runtime of the network device 400.

In one embodiment, these software agents may include forwarding agent 414 and one or more feature agents 412. When network device 400 boots up, forwarding agent 414 for each subdomain 402 may bring up and configure the packet processing hardware 404 associated with that subdomain 402, including the interfaces 406 (e.g., the internal, or not user visible interfaces) comprising that subdomain 402. The forwarding agent 414 can also communicate subdomain configuration data 426 to the central agent 424. This subdomain configuration data 426 can include, for example, identification of packet processing hardware 404 and the interfaces 406 comprising the associated subdomain 402 and their associated capabilities or status. Specifically, forwarding agent 414 for subdomain 402 may populate a corresponding directory associated with the subdomain 402 with configuration data 426 associated with that subdomain 402. Central configuration agent 424 may thus access the subdomain configuration data 426 at the location in system database 490 where it is stored.

Utilizing the subdomain configuration data 426 supplied by the forwarding agents 414 within each subdomain 402, central configuration agent 424 may determine one or more forwarding models 482 for path 430. In some embodiments, for example, there may be a forwarding model 482 for each feature that may be configured in association with path 430. Forwarding model 434 (e.g., for a feature) may maintain a set of interfaces 406 of the path 430 that may be configured when that corresponding feature is configured by a user in the configuration interface 450 using the representative user visible interface 432 for the path 430. The set of interfaces 406 of the path 430 specified in a forwarding model 434 for a feature may thus be a reduced set of interfaces 406 relative to the entire set of interfaces 406 comprising that path 430 and may only include interfaces 406 relevant to the implementation of that feature within the path 430 or the set of interfaces 406 that may need to be configured when that feature is configured for that path 430.

Central configuration agent 424 may also utilize subdomain configuration data 426 to determine an associated capability 444 for each feature 446 of path 430. In particular, central configuration agent 424 may include capabilities resolver 472 that resolves the capabilities of each feature 446 that are available across path interface 438 of path 430. In one embodiment, when path 430 is established or (reconfigured) the available capabilities of each interface 406 of path interfaces 438 of path 430 may be determined for each feature 446 (e.g., that may be configurable for path 430). These capabilities may be determined by reference to subdomain configuration data 426 that may include capabilities for interfaces 406 of each subdomain 402. For each feature 446, capabilities resolver 472 can then evaluate the available capabilities of each interface 406 of path 430 (e.g., in path interfaces 438) to determine those capabilities for the feature that are available across all the interfaces 406 of the path 430. These available capabilities 444 for each feature 446 can be stored in the system database 490 in association with that path 430 (e.g., and in association with the corresponding feature 446 and representative user visible interface 432 for path 430). Only these available capabilities 444 may be advertised for the representative user visible interface 432 though through the configuration interface 450, and any attempts by a user to configure feature 446 according to an unavailable capability (e.g., a capability for feature 446 other than available capability 444) may return an error.

Central configuration agent 424 may also make use of subdomain configuration data 426 to determine status 488 to associate with path 430 (e.g., to associate with representative user visible interface 432). As discussed, a user may access status 488 maintained for path 430 through configuration interface 450 using representative user visible interface 432. Because such a status may only exist with respect to particular interfaces 406 of the path that may only exist in certain subdomains 402, status replicator 494 may be provided to determine status 488 to associate with path 430 (and user visible interface 432 for path 430) based on statuses reported for interfaces 406 from each subdomain 402 that includes interfaces 406 in path interfaces 438 of path 430.

Specifically, forwarding agent 414 in each subdomain 402 may monitor the status of interfaces 406 in that subdomain 402, and provide the statuses of those interfaces 406 in subdomain configuration data 426. Status replicator 494 can access these statuses associated with interfaces 406 of path 430 in subdomain configuration data 426 to determine status 488 to be associated with path 430. According to one embodiment, status replicator 494 may apply status determination strategy 496 to the statuses reported for interfaces 406 of path 430 from each subdomain 402 to determine status 488 to associate with representative user visible interface 432 for path 430, where that status determination strategy 496 may be based on interfaces 406 comprising that path 430 or other configuration information. For example, one strategy may be to simply copy a status reported for a particular interface 406 of path 430 to associate that reported status with the representative user visible interface 432. In this manner, status 488 may be associated with representative user visible interface 432 for path 430 and returned to (or otherwise accessed by) the user through the configuration interface 450. Namely, a user may request a status and specify representative user visible interface 432, and determined status 488 may be returned in response to such a request.

To implement the configuration of interface 406 of subdomain 402 for a feature, subdomain 402, in addition to forwarding agent 414, also includes one or more feature agents 412. Each of the feature agents 412 of subdomain 402 may be adapted to configure interfaces 406 of that subdomain 402 to obtain a configuration for a particular feature. For example, a first feature agent 412 may be adapted to configure a speed of one or more interfaces 406 of the subdomain 402, a second feature agent 412 may be adapted to configure FEC on one or more interfaces 406 of the subdomain 402, etc. Thus, feature agent 412 may be adapted to determine a configuration for a feature associated with an interface 406 and configure that interface 406 accordingly by configuring hardware resources of the packet processing hardware 404 of that subdomain 402.

To configure the interfaces 406 for a feature, configuration table 416 may be maintained for subdomain 402. This configuration table 416 may map (e.g., an identifier for) an interface 406 to a feature, and to one or more hardware resources of packet processing hardware 404 to be configured to configure the interface 406 for that feature. In one embodiment, the subdomain configuration data 426 reported by the forwarding agent 414 of the subdomain at (e.g., the set of interfaces and features reported by forwarding agent 414 of the subdomain 402 at boot up of network device 400) may be utilized by central configuration agent 424 to configure configuration table 416 based on the representative user visible interface 432 for path 430 to map the representative user visible interface 432 of path 430 to underlying hardware resources of packet processing hardware 404 of that subdomain 402 associated with a feature in configuration table 416. In this manner, when a feature configuration 448 is changed for a feature 446 in association with representative user visible interface 432 of path 430, corresponding feature agent 412 for that feature 446 may access configuration table 416 based on representative user visible interface 432 and the feature 446 configured to determine the hardware resources of packet processing hardware 404 to configure (if any), and configure those underlying hardware resources specified in configuration table 416 to implement that feature configuration 448 for the interfaces 406 of that path 430 included in that subdomain 402.

In certain embodiments, each of the feature agents 412 may include a platform independent (PI) agent and a platform dependent (PD) agent. As each subdomain 402 may include its own packet processing hardware 404 and associated interfaces 406 (where that packet processing hardware 404 may be different across subdomains 402) and corresponding hardware resources, a PI agent for a feature may accept a configuration for a feature specified for an interface (e.g., user visible interface 432) in a platform independent manner (e.g., as stored in system database 490). The PI agent for a feature then translates that configuration to an internal specification for the configuration (e.g., which may be hardware or software platform dependent) for the configuration for that feature and interface (e.g., representative user visible interface 432). The associated PD agent can then use that internal specification for the configuration to configure the hardware resources of packet processing hardware 404 of the subdomain 402 to implement that configuration for the interface 406.

Accordingly, when the user configures a feature for the path in the configuration interface 450 using the representative user visible interface, this configuration may be received at the central configuration agent 424. The central configuration agent 424 may determine which interfaces 406 of which subdomains 402 need to be configured for that feature using a forwarding model 434 associated with that path 430 (e.g. using a forwarding model 434 associated with the feature for that path 430), and how that feature needs to be configured for that interface. That configuration can be communicated to the feature agent 412 responsible for those features in each subdomain that includes those interfaces. For example, the configuration for the feature may be stored in the system database 490 where the feature agent 412 may detect that the configuration for the feature for the interface applies to an interface in the subdomain corresponding to that feature agent 412 has changed. The feature agent 412 can then configure the interface 406 as specified in its configuration table 416 to modify the underlying packet processing hardware 404 of that subdomain 402 to implement the configuration for that feature for that interface 406. In this manner, the interfaces 406 comprising path 430 across subdomains 402 may be individually configured for a specified feature based on a received configuration of the path 430 specifying the representative user visible interface 432.

Figure 5:
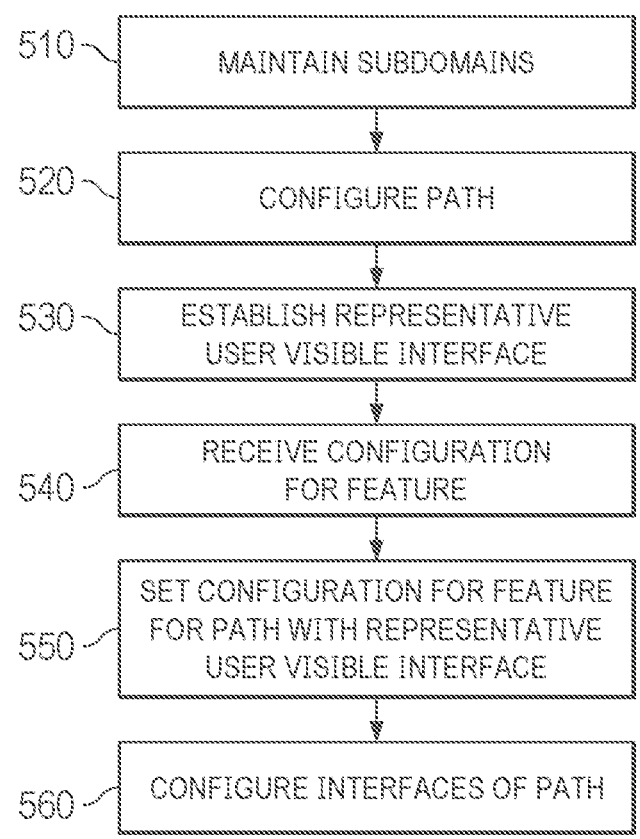
FIG. 5 is a flow diagram for one embodiment of a method for configuring a path using a representative user visible interface.

FIG. 5 depicts one embodiment of a method that may be utilized by network devices to configure a path using a representative user visible interface for that path. As discussed, a network device may maintain a set of subdomains (STEP 510). Specifically, a network device can connect together the hardware of a network device to establish a number of subdomains where each of the subdomains may include underlying packet processing hardware. The packet processing hardware comprising a subdomain may include a number of interconnected interfaces that correspond to virtual ports or physical ports associated with the underlying packet processing hardware.

Using these subdomains one or more paths for packet processing may be configured at the network device (STEP 520). These paths may thus include a set of interfaces spanning one or more subdomains. Such paths may be defined, for example, through a configuration interface offered by the network device, such as a CLI or the like, such that configuration for the path is stored in a central system database at the network device.

For example, a path may include a set of (e.g., ordered) path interfaces defined for the path. This set of interfaces comprising a path may, for example, be stored in a central system database at the network device. The interfaces may comprise virtual or physical ports defined in the network device, including one or more physical or virtual front panel ports of the device. As put one example, a path may be defined as the set of path interfaces comprising:

Et2, Ap1/2, Ap 1/4, Ap1/5 where Et2 may be a front panel port, and Ap1/2, Ap1/4 and Ap1/5 are interfaces included in packet processing hardware of one or more subdomains.

Each path may also have a representative user visible interface established for it (STEP 530). That representative user visible interface may be selected as the (identifier of) the physical front panel port associated with that path (e.g., included in the set of path interfaces for the path). The representative user visible interface can be stored in association with the (set of interfaces comprising the) path in the central database at the network device. This representative user visible interface may thus be used to represent the set of path interfaces comprising the path at the network device. Continuing with the above example, then, the representative user interface for the example path may be "Et2".

Accordingly, a set of features (e.g., speed, FEC, autonegotiate capability, etc.) may be configured in accordance with a defined path (e.g., during operation of the network device), where each of these features may have an associated configuration. A configuration for one or more of those features may be received (e.g., from a user) in accordance with the path and specifying the representative user visible interface (STEP 540). For example, a command to configure the speed in association with the example path above may be:

configure Et2 speed 25 mbps

Based on the received configuration for the feature specified in accordance with the representative user visible interface, the interfaces of the path represented by that representative user visible interface may be configured. In particular, the received configuration for that feature may be set in accordance with that path by associating the received configuration for that feature with the representative user visible interface for that path (STEP 550). For example, the configuration for the feature may be stored in association with the representative user visible interface for the path in a central database at the network device.

Based on the configuration set of that feature, the individual interfaces comprising the path corresponding to implementation of that feature may be configured to implement that configuration for the feature for the path across the one or more subdomains comprising those interfaces (STEP 560). In particular, each subdomain may comprise a software agent that obtains the configuration for the feature as specified in the central database at the network device and determines if any interfaces of the corresponding subdomain should be configured based on the obtained configuration for that feature. If the software agent of the subdomain determined that any interfaces of the subdomain should be configured, the software agent of that subdomain can configure the underlying hardware resources of that subdomain associated with those interfaces accordingly. In this manner, when a feature configuration is changed for a feature in association with a path using the representative user visible interface for that path, that feature configuration can be implemented with respect to the individual interfaces comprising that path across the subdomains that include those interfaces.

Embodiments as disclosed thus provide a simplified way for users to configure paths, and apply this configuration to interfaces on the path, using a single representative user visible interface, even when the interfaces of the path reside on different subdomains. Accordingly, embodiments may thus provide the advantages of hiding the complexity of configuring these paths and providing a configuration mechanism that is both less confusing—users will no longer need to know or guess which config should be applied on which interface, and less cumbersome—by avoiding the need for a user to repeatedly configure multiple interfaces in the same manner. Moreover, embodiments may allow this configuration to be enabled at an individual data path level whereby users can control which interface in the path is visible.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for configuring paths in a network device, the method comprising:
   maintaining a set of subdomains, wherein each subdomain comprises packet processing hardware of the network device and interfaces of that subdomain;
   configuring a path at the network device, the path comprising a set of the interfaces across the subdomains;
   establishing a representative user visible interface for the path, wherein the path includes the representative user visible interface and corresponds to a physical front panel port of the network device;
   receiving a configuration for a feature through a configuration interface, the configuration specifying the representative user visible interface for the path; and
   individually configuring the set of interfaces of the subdomains comprising the path according to the feature based on the received configuration specifying the representative user visible interface.

2. The method of claim 1, wherein the set of interfaces comprising the path are associated with at least two different subdomains.

3. The method of claim 1, wherein each subdomain comprises an integrated circuit (IC) that is different from ICs corresponding to other subdomains.

4. The method of claim 3, wherein the interfaces of each subdomain comprise interfaces associated with the IC chip of that subdomain.

5. The method of claim 1, further comprising:
determining a status associated with an interface of the set of interfaces of the subdomains;
associating the determined status with the path;
receiving a status request specifying the representative user visible interface for the path;
returning the determined status in response to the status request.

6. The method of claim 5, further comprising:
receiving one or more statuses associated with the set of interfaces of the subdomains comprising the path from one or more of the subdomains; and
determining the status based on a status determination strategy.

7. A network device, comprising:
a set of subdomains, wherein each subdomain comprises associated packet processing hardware comprising interfaces of that subdomain and interfaces of that subdomain;
a non-transitory computer readable medium, comprising instructions for:
establishing a representative user visible interface for a configured path, wherein the path comprises a set of the interfaces across the subdomains and the set of interfaces includes the representative user visible interface and corresponds to a physical front panel port of the network device;
receiving a configuration for a feature, the configuration specifying the representative user visible interface for the path; and
individually configuring the set of interfaces of the subdomains comprising the path according to the feature based on the received configuration specifying the representative user visible interface.

8. The network device of claim 7, wherein each subdomain comprises packet processing hardware of the network device comprising an integrated circuit (IC) that is different from ICs corresponding to other subdomains.

9. The network device of claim 8, wherein the set of interfaces comprising the path are in the same subdomain.

10. The network device of claim 7, wherein the set of interfaces comprising the path are on the same IC.

11. The network device of claim 7, wherein each subdomain comprising a software agent adapted to:
determine the configuration for the feature in association with the representative user visible interface;
determine an interface of the subdomain is associated with that feature and that representative user visible interface;
configure the determined interface according to the feature based on the received configuration by configuring the packet processing hardware of the subdomain in accordance with the configuration for the feature.

12. A non-transitory computer readable medium, comprising instructions executable on a processor for:
configuring a path at a network device, the path comprising a set of interfaces across a set of subdomains, each subdomain comprising packet processing hardware of the network device and interfaces of that subdomain:
establishing a representative user visible interface for the path, wherein the path includes the representative user visible interface and corresponds to a physical front panel port of the network device;
receiving a configuration for a feature through a configuration interface, the configuration specifying the representative user visible interface for the path; and
individually configuring the set of interfaces of the subdomains comprising the path according to the feature based on the received configuration specifying the representative user visible interface.

13. The non-transitory computer readable medium of claim 12, wherein the set of interfaces comprising the path are associated with at least two different subdomains.

14. The non-transitory computer readable medium of claim 12, wherein each subdomain comprises packet processing hardware of the network device comprising an integrated circuit (IC) that is different from ICs corresponding to other subdomains.

15. The non-transitory computer readable medium of claim 14, wherein the interfaces of each subdomain comprise interfaces associated with the IC chip of that subdomain.

16. The non-transitory computer readable medium of claim 12, further comprising:
determining a status associated with an interface of the set of interfaces of the domain;
associating the determined status with the path;
receiving a status request specifying the representative user visible interface for the path;
returning the determined status in response to the status request.

17. The non-transitory computer readable medium of claim 16, further comprising:
receiving one or more statuses associated with the set of interfaces of the subdomains comprising the path from one or more of the subdomains; and
determining the status based on a status determination strategy.

* * * * *